United States Patent [19]

Price et al.

[11] Patent Number: 4,782,958

[45] Date of Patent: * Nov. 8, 1988

[54] TAPE-CARTRIDGE STORAGE SYSTEM

[75] Inventors: Macy J. Price, Golden; Laurence G. Ball, Thornton, both of Colo.

[73] Assignee: Engineered Data Products, Inc., Broomfield, Colo.

[*] Notice: The portion of the term of this patent subsequent to Jul. 15, 2003 has been disclaimed.

[21] Appl. No.: 87,776

[22] Filed: Aug. 21, 1987

Related U.S. Application Data

[63] Continuation of Ser. No. 883,110, Jul. 8, 1986, Pat. No. 4,688,682, which is a continuation of Ser. No. 767,154, Aug. 19, 1985, Pat. No. 4,600,107.

[51] Int. Cl.⁴ .............................................. A47F 7/00
[52] U.S. Cl. ...................................... 211/41; 211/126
[58] Field of Search .................. 211/41, 42, 43, 189, 211/126, 75, 88, 194; 312/8, 9, 10

[56] References Cited

U.S. PATENT DOCUMENTS

| | | | |
|---|---|---|---|
| D. 211,706 | 7/1968 | Blomeyer | 206/387 X |
| 3,677,393 | 7/1972 | Staar | 312/10 X |
| 3,710,900 | 1/1973 | Fink | 312/10 X |
| 3,812,960 | 5/1974 | Falletta et al. | 312/10 X |
| 3,856,369 | 12/1974 | Commiant | 206/387 X |
| 3,885,668 | 5/1975 | McClain | 211/126 X |
| 4,600,107 | 7/1986 | Price et al. | 211/41 |
| 4,688,682 | 8/1987 | Price et al. | 211/41 |

Primary Examiner—Robert W. Gibson, Jr.
Attorney, Agent, or Firm—Klaas & Law

[57] ABSTRACT

A tape cartridge storage unit is provided so that two or four tape cartridge storage holders may be retained in a side by side relationship on a plurality of vertically spaced shelves. Each shelf has a width substantially equal to the combined width of two or four tape cartridge storage holders and the distance between adjacent shelves is substantially equal to the height of the tape cartridge storage holder so that a maximum number of tape cartridges may be stored in a minimum space. The unit is an all steel welded construction.

5 Claims, 1 Drawing Sheet

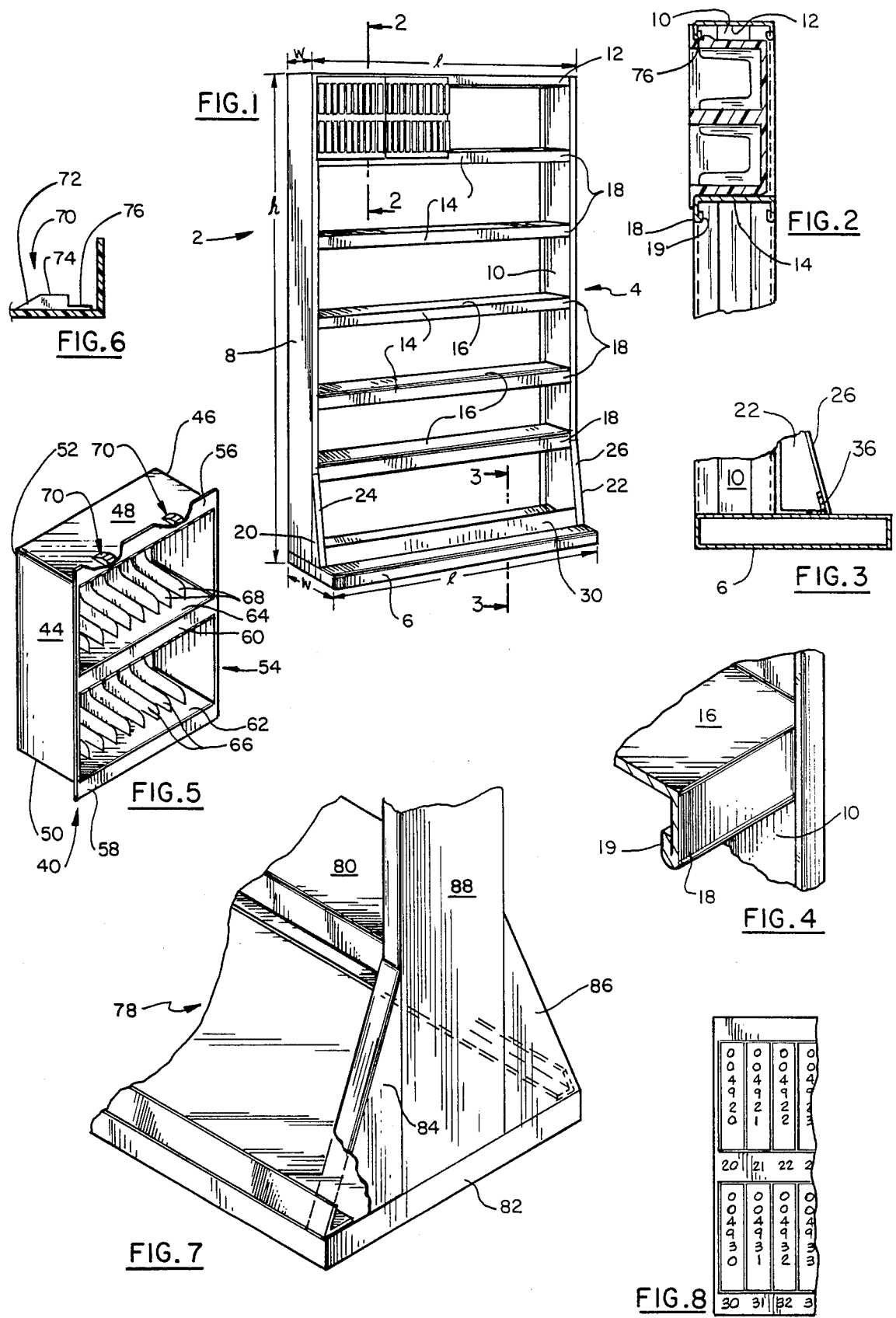

TAPE-CARTRIDGE STORAGE SYSTEM

This application is a continuation of U.S. patent application Ser. No. 883,110, filed July 8, 1986, now U.S. Pat. No. 4,688,682, which applicaiton was a continuation of U.S. patent application Ser. No. 767,154, filed Aug. 19, 1985, now U.S. Pat. No. 4,600,107.

FIELD OF THE INVENTION

This invention relates to the storage of tape cartridges and in particular to a tape cartridge storage system wherein the maximum number of tape cartridges may be stored in a minimum space and wherein the system and the tape cartridges are provided with a color coded indexing system that make storage and retrieval of the tape cartridges most effective.

BACKGROUND OF THE INVENTION

The use of computers in today's business operations has generated one pressing problem relating to the storage and retrieval of tape cartridges. With the costs of office space increasing regularly and the number of tape cartridges requiring space for storage and retrieval, computer departments are searching constantly for more effective systems for the storage and retrieval of tape cartridges. There are several types of storage systems on the market for use in the storage and retrieval of tape cartridges but all storage systems are constantly fighting the battle of being able to store the maximum number of tape cartridges in the minimum space. Also, the storage system must be rugged so as to withstand the constant use. Also, the storage system has to provide space for an indexing system so that the tape cartridges may be stored in a location from which they may be readily retrieved.

SUMMARY OF THE INVENTION

This invention provides a system in which tape cartridges may be readily stored and retrieved and wherein a maximum number of tape cartridges may be stored in a minimum space. The invention provides a single sided storage unit for use against a wall and a double sided storage system for use where an aisle is needed. In both designs, the bottom level of the unit has been angled to the vertical to make reading the indexing system easier. Also, the system provides space so that a color coded indexing system may be used for proper and efficient storage and retrieval of tape cartridges.

In a preferred embodiment of the invention, the tape cartridge storage system comprises a frame having a base, two spaced apart opposed side walls and a top shelf. A plurality of vertically spaced apart shelves are secured at each ends thereof to an adjacent side wall preferably by welding. A plurality of tape cartridge storage holders comprising an open housing having an upper flange and a lower flange extending therefrom are dimensioned to fit between the shelves and have a length so that a plurality of the tape cartridge holders will substantially completely fill the length of each shelf between the sidewall. The tape cartridge storage holders are inserted between adjacent shelves until the upper and lower flanges contact the facing surfaces of adjacent shelves. Also, the upper and lower flanges provide handles for easy grasping of the tape cartridge storage holders for transporting the tape cartridge holders from one location to another. The flanges also provide space for a portion of a color coded indexing system that cooperates with a color coded indexing system on the tape cartridges so that the tape cartridges may be properly and efficiently stored and retrieved. If desired, means may be provided for retaining the tape storage holders in a position. In a preferred embodiment of the invention, the mean for retaining the tape storage holders in position comprises locking tabs secured to the outer surface of the top wall for receiving at least a portion of the shelf means. Also, the housing is provided with a plurality of partition means so as to provide a separate compartment for each tape cartridge.

It is an object of this invention to provide a tape cartridge storage system wherein a maximum number of tape cartridges may be stored in a minimum space.

It is another object of this invention to provide a tape cartridge storage system that is of rugged but attractive construction.

It is a further object of this invention to provide a tape cartridge storage system having a single sided storage unit for use against a wall and a double sided storage system where an aisle is needed.

Additional objects, advantages and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 1 is a pictorial view of a single sided storage unit of this invention;

FIG. 2 is a cross-sectional view along the line 2—2 of FIG. 1 and illustrating the retaining means;

FIG. 3 is an enlarged cross-sectional view along the line 3—3 of 1;

FIG. 4 is an enlarged view with parts in cross section of a shelf;

FIG. 5 is a pictorial view of a tape cartridge storage holder;

FIG. 6 is an enlarged view of a locking tab;

FIG. 7 is a pictorial view of a portion of a double sided storage unit of this invention; and FIG. 8 a is partial front elevation showing the indexing system.

DETAILED DESCRIPTION OF THE INVENTION

In FIG. 1, there is illustrated a single sided storage unit 2 comprising a frame 4 having a base 6, a pair of spaced apart opposed side walls 8 and 10 and a top shelf 12. The base 6 has a length 1 greater than its width w and is generally rectangularly shaped in cross section. Each of the side walls 8 and 10 has a height h greater than its width w and is generally U-shaped in cross section with the U opening in an inwardly facing direction. The top 12 has a length 1 greater than its width w and is generally U-shaped in cross section in a downwardly facing direction. A plurality of vertically spaced apart shelves 14 are secured at each end thereof to the adjacent portion of the sidewalls 8 and 10 by suitable means, preferably by welding. Each shelf 14 has a length and a width corresponding to the length and width of the top shelf 12. Except for the bottom shelf, to be described below, each shelf has a surface 16 lying generally in a horizontal plane and is generally U-shaped in cross section with the U opening in a downwardly facing direction to provide front wall portions having flanges 18 which have a folded portion 19 for strength.

The bottom portion of the storage unit 2 is constructed to make the reading of the cartridge and storage unit indicia easier. A pair of right triangularly shaped sections 20 and 22 are secured to the side walls 8 and 10 and base 6, preferably by welding. The angled surfaces 24 and 26 of the sections 20 and 22 extend at an angle of between about 13 degrees to 17 degrees to the vertical, preferably about 15 degrees to the vertical. The construction of the top of the base 6 is illustrated in FIG. 3 and has a front angle section 30 inclined to the vertical an amount corresponding to the surfaces 24 and 26 and to which the surfaces 24 and 26 abut. The angle section 30 extends between the side walls 8 and 10 and are adapted to support a portion of a tape cartridge holder, as described below so that the tape cartridges are inclined to the horizontal at an angle of about 13 degrees to 17 degrees and preferably about 15 degrees to the horizontal.

A tape cartridge storage holder 40 is illustrated in FIG. 5 and comprises a hollow housing 42 having end walls 44 and 46, a top wall 48, a bottom wall 50, a rear wall 52 and a front opening 54. An upper flange 56 extends upwardly from the top wall 48 and a bottom flange 58 extends downwardly from the bottom wall 50. A panel 60 extends between the end walls 44 and 46 so as to divide the housing 42 in half and provide a bottom shelf 62 and a top shelf 64 on which tape cartridges may be supported. A plurality of partitions 66 extend upwardly from the bottom shelf 62 and extend continuously (not shown) along the back wall 52 and extend downwardly (not shown) from the panel 60. A similar plurality of portion 68 extend upwardly from the top shelf 64 and extend continuously (not shown) along the back wall 52 and extend downwardly (not shown) from the top wall 48. The partitions 66 and 68 effectively form a plurality of individual compartments each of which houses a tape cartridge.

As illustrated in FIGS. 2 and 5, each tape cartridge storage holder 40 is provided with locking tabs 70 which are secured to the outer surface of the top wall 48. Each locking tab 70 has an inclined surface 72 leading to a flat surface 74 which terminates in a recess 76. As illustrated in FIG. 2, when the tape cartridge storage holder 40 is positioned on the shelf 14, a portion of the flange 18 and folded portion 19 are received in the recess 74 so as to retain each of the tape cartridge storage holders 40 in proper position on the shelf 14. When the bottom wall 50 of a tape cartridge storage holder 40 is supported on the upper edge of the angle section 30 and the portion of the flange 18 and folder portion 19 is located in the recess 76, the front of the tape cartridge storage holder 40 will be at an angle of about 15 degrees to the vertical.

A portion of a double sided unit 78 is illustrated in FIG. 7 and essentially comprises two single sided units placed back to back. Each shelf surface 80 is about twice as wide as each shelf surface 16 so as to accommodate two tape cartridge storage holders 40 in back to back relationship. The base 82 of the double sided unit 78 has a width greater than the width of the base 6 of the single sided unit 2 in an amount approximately the same as the width of the end walls 44 and 46 of the tape cartridge storage holder 40. The right triangularly shaped sections 84 and 86 are similar to the right triangularly shaped sections 20 and 22 but differ in that the sum of the widths at the bottom of the right triangularly shaped sections 74 and 86 and the side wall 88 is substantially equal to the width of the base 82.

The color coded indexing system is illustrated in FIG. 8. The front surface of the panel 60 is provided with a series of numbers 20, 21, and 22 etc. and the front surface of the lower flange 58 is provided with a series of numbers 30, 31 and 32 etc. The first digit 2 is in a color different from the color in the first digit 3. All of the second digits are in the same color. Located above these members are positioned tape cartridges having a six digit number thereon. The final two digits in the tape cartridge correspond to the two digits on the panel 60 or bottom flange 58 and are corresponding color coded. The first four digits of the six digit number will be in colors different from the colors of the last two digits. Also, the color of at least one of the first four digits will be different from the color of the other digits.

The single sided and double sided storage units are preferably formed from steel. In a single sided storage unit for two tape cartridge storage holders 40 in a side by side relationship, the available space between the ends of the U-shaped side walls is about 23.0 inches. The length of each tape cartridge storage holder in the corresponding direction is about 11.5 inches. The distance between the surface of the shelf and the ends of the U-shaped adjacent shelf is about 10.0 inches and the height of the tape cartridge storage holder in the same direction is about 10.0 inches. In a single sided storage unit for four tape cartridge storage holders in a side by side relationship, the available space between the ends of the U-shaped side walls is about 46.0 inches. The combined length of four tape cartridge storage holders in the same direction is about 46.0 inches. A tape cartridge storage system different from this invention has the capacity for 91,200 tape cartridges in a 40×44 foot installation. A tape cartridge storage system of this invention has the capacity for 110,400 tape cartridges in a 40×44 foot installation.

It is contemplated that the inventive concepts herein described may be variously otherwise embodies and it is intended that the appended claims be construed to include alternative embodiments of the invention except insofar as limited by the prior art.

What is claimed is:

1. A storage system for computer tape cartridges comprising:

a plurality of equal size box-type tape cartridge storage holder units made of one piece of molded plastic material, each of said tape cartridge storage holder units having at least a top wall portion, a bottom wall portion and opposite side wall portions connected at one end by a transverse connecting rear wall portion to provide a rectangular storage space therewithin and having an access opening at the opposite end and having divider means therein to support at east two parallel rows of multiple tape cartridges arranged in side by side relationship;

a storage rack means having a plurality of horizontally extending vertically equally spaced shelf means defining a plurality of horizontally extending vertically spaced rows of equal size storage openings for receiving and supporting said tape cartridge storage holder units in side by side relationship in each of said storage openings in a plurality of horizontally extending equally vertically spaced rows of tape cartridge storage holder units with said open sides of said tape cartridge storage holder units facing outwardly away from said storage rack means to permit insertion and removal of said tape cartridges from said tape cartridge storage holder units and also to permit selective removal and placement of each of said tape cartridge storage holder units on said shelf means;

each of said shelf means having an outwardly facing vertically extending front wall portion and each front wall of each of said shelf means having an equal vertical dimension;

each of said tape cartridge storage holder units having a vertical dimension between said top wall portion and said bottom wall portion which is approximately equal to the vertical dimension of said equal size storage openings and having a horizontal dimension between said opposite wall portions being a multiple of the horizontal dimension of said equal size storage openings so that each of said equal size storage openings is substantially filled by said tape cartridge storage holder units mounted on each of said shelf means;

each of said tape cartridge storage holder units having at least one laterally outwardly extending generally rectangular shaped flange portion adjacent said cartridge access opening for location in front of the front side surface of an associated one of said shelf means when located in one of said equal size storage openings and supported on one of said shelf means; and means for retaining said tape cartridge storage holder units in position on said shelf means.

2. A system as in claim 1 wherein said means for holding said tape cartridge storage holder units in position on said shelf means comprises:

a locking tab secured to at least a portion of said top wall portion.

3. A system as in claim 2 wherein said means for holding said tape cartridge storage holder units in position on said shelf further comprises:

a recess formed in said locking tab; and a portion of said front wall portion located in s said recess.

4. A holder for computer tap cartridges comprising:

a tape cartridge storage holder unit made of one piece of molded plastic material and having at least a top wall portion, a bottom wall portion and opposite side wall portions connected at one end by a transverse connecting rear wall portion to provide a rectangular storage space therewithin and having an access opening at the opposite end and having divider means therein to form compartments for supporting at least two parallel rows of multiple tape cartridges arranged in a side by side relationship; and each of said tape cartridge storage holder units having at least one laterally outwardly extending generally rectangular shaped flange portion adjacent said cartridge access opening adapted to contact a shelf means when said tape cartridge storage holder unit is placed thereon so that said tape cartridge storage holder unit is properly positioned thereon.

5. A holder for tape cartridges comprising:

a housing having at least one open side;

said housing having end walls, a top wall, a bottom wall and a back wall;

an upper flange extending upwardly from said top wall at an angle of about 90 degrees and being continuous from locations adjacent to said end walls and a lower flange extending downwardly form said bottom wall at an angle of about 90 degrees and being continuous from locations adjacent to said end walls;

said upper flange having a front surface and a rear surface;

said lower flange having a front surface and a rear surface; and said front surface of said upper and lower flanges lying in a common plane and said rear surfaces of said upper and lower flanges lying in a common plane;

means secured to at least said end walls for forming a plurality of shelves; and means associated with said shelves for forming a plurality of compartments, each compartment having dimensions adapted to receive and hold a tape cartridge.

* * * * *